(12) United States Patent
Jow et al.

(10) Patent No.: US 6,388,051 B1
(45) Date of Patent: May 14, 2002

(54) PROCESS FOR SELECTING A POLYETHYLENE HAVING IMPROVED PROCESSABILITY

(75) Inventors: Jinder Jow, Somerville, NJ (US); Alfred Mendelsohn, Brooklyn, NY (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/741,246

(22) Filed: Dec. 20, 2000

(51) Int. Cl.$^7$ .................. C08F 210/16; B29C 47/00
(52) U.S. Cl. ............. 528/502 R; 526/348; 526/348.2; 526/348.3; 526/348.5; 526/348.6; 526/916; 264/176.1; 264/331.17; 174/110 SR
(58) Field of Search .................. 526/348.2, 348.3, 526/348.5, 348.6, 348, 916; 264/176.1, 331.17; 174/110 SR; 528/502 R

(56) References Cited

U.S. PATENT DOCUMENTS

| | | | | |
|---|---|---|---|---|
| 4,078,111 A | * | 3/1978 | Yamaguchi et al. | 264/171.4 X |
| 4,101,445 A | | 7/1978 | Levine et al. | 252/429 |
| 4,302,565 A | | 11/1981 | Goeke et al. | 526/88 |
| 4,438,238 A | | 3/1984 | Fukushima et al. | 525/240 |
| 4,508,842 A | | 4/1985 | Beran et al. | 502/112 |
| 4,522,987 A | | 6/1985 | Hogan et al. | 526/106 |
| 4,530,914 A | | 7/1985 | Ewen et al. | 502/113 |
| 4,857,232 A | | 8/1989 | Burns | 252/511 |
| 4,857,600 A | | 8/1989 | Gross et al. | 525/285 |
| 4,937,299 A | | 6/1990 | Ewen et al. | 526/119 |
| 5,013,802 A | | 5/1991 | Tajima et al. | 526/86 |
| 5,290,745 A | | 3/1994 | Jorgensen et al. | 502/109 |
| 5,317,036 A | | 5/1994 | Brady, III et al. | 523/223 |
| 5,332,793 A | | 7/1994 | Cann | 526/129 |
| 5,342,907 A | | 8/1994 | Cann et al. | 526/129 |
| 5,410,003 A | | 4/1995 | Bai | 526/133 |
| 5,575,965 A | * | 11/1996 | Caronia et al. | 264/171.17 |

FOREIGN PATENT DOCUMENTS

| | | |
|---|---|---|
| EP | 0341644 | 11/1989 |
| EP | 0524624 | 1/1993 |
| WO | WO96/07680 | 3/1996 |

* cited by examiner

Primary Examiner—Fred Teskin

(57) ABSTRACT

A process for selecting and extruding a copolymer having improved extrusion processability comprising (a) selecting one or more copolymers of ethylene and one or more alpha-olefins having 3 to 12 carbon atoms, each of said copolymers having essentially no long chain branching and having (1) a melt index selected from the range of about 0.1 to about 20 grams per 10 minutes, and (2) a melt flow ratio having at least about a value determined by the following formula: 2.7183 to the power of {(1.477 minus [0.279 times the natural logarithm of the selected melt index]) divided by 0.29} and (b) extruding said copolymer around an electrical conductor.

5 Claims, No Drawings

PROCESS FOR SELECTING A POLYETHYLENE HAVING IMPROVED PROCESSABILITY

TECHNICAL FIELD

This invention relates to a process for selecting a polyethylene having improved processability in the manufacture of power cable.

BACKGROUND INFORMATION

A typical electric power cable generally comprises one or more conductors, which form a cable core that is surrounded by several layers of polymeric material including a first semiconducting shield layer, an insulating layer, a second semiconducting shield layer, a metallic tape or wire shield, and a jacket.

One of the properties that polymeric material should exhibit for it to be useful in the manufacture of power cable is processability, i.e., the capability of being extruded around the cable conductor at a desirably high rate of application. Processability correlates to viscosity at given temperatures and shear rates. As the extrusion process requires the input of heat energy to soften the polymeric material and the input of kinetic energy to force the polymeric material through the various dies or orifices onto the cable, one attribute of good processability is when a relatively lower amount of kinetic energy is needed to extrude the material around the cable conductor at a given application rate. Of course, the polymeric material should exhibit other desired properties as well such as strength and retention of its integrity once it has been applied onto the cable.

It has been believed that the presence of long chain branching is required to achieve the best processability such as with conventional LDPE (low density homopolymer of ethylene made by a high pressure process). Industry, however, would like to avoid using polyethylenes with long chain branching especially those made by high pressure techniques, and is interested in being able to select polyethylenes, which are essentially free of long chain branching, but have comparable processability.

DISCLOSURE OF THE INVENTION

An object of this invention, therefore, is to provide a process for the manufacture of a cable by extrusion in which a polyethylene having essentially no long chain branching and improved processability is selected. Other objects and advantages will become apparent hereinafter.

According to the present invention, such a process has been discovered.

The process is one for selecting and extruding a copolymer having improved extrusion processability comprising (a) selecting one or more copolymers of ethylene and one or more alpha-olefins having 3 to 12 carbon atoms, and, optionally, a diene, each of said copolymers having essentially no long chain branching and having (1) a melt index selected from the range of about 0.1 to about 20 grams per 10 minutes, and (2) a melt flow ratio having at least about a value determined by the following formula: 2.7183 to the power of {(1.477 minus [0.279 times the natural logarithm of the selected melt index]) divided by 0.29} and (b) extruding said copolymer around an electrical conductor.

DESCRIPTION OF THE PREFERRED EMBODIMENT(S)

The present invention is based on the discovery that a certain class of linear ethylene alpha-olefin copolymers, and blends thereof, essentially without long chain branching exhibit equal or lower viscosity (better processability) than conventional LDPEs with long chain branching across the whole range of shear rates, 100 to 1000 per second when applied to various conductors. By "long chain branching" is meant a polymer having branches at least about 250 carbon atoms in length. One of the characteristics of long chain branches is that they become entangled in the melt state so they can also be described as being at least as long as the entanglement molecular weight of about 3800 Daltons since that corresponds to the minimum chain length required to be recognized by the melt rheological properties of polyethylene (See Ferry, *Viscoelastic Properties of Polymers*, John Wiley & Sons, 1980, pages 243 and 378).

The polyethylene used in the process of the invention is a copolymer of ethylene and one or more alpha-olefins having 3 to 12 carbon atoms, and preferably 4 to 8 carbon atoms, and, optionally, a diene, or a mixture of such copolymers. The mixture can be a mechanical blend or an in situ blend. Examples of suitable alpha-olefins are propylene, 1-butene, 1-hexene, 4-methyl-1-pentene, and 1-octene.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight.

The copolymers of interest according to the present invention can have a melt index in the range of 0.1 to 20 gram per 10 minutes, and preferably have a melt index in the range of 1 to 10 gram per 10 minutes. Once the melt index is selected the melt flow ratio is determined. The melt flow ratio has at least about a value determined by the following formula: 2.7183 to the power of {(1.477 minus [0.279 times the natural logarithm of the selected melt index]) divided by 0.29}. The preferred minimum melt flow ratio for copolymers produced using metallocene catalyst systems is at least about 10 percent higher than for copolymers produced using other transition metal catalyst systems such as Ziegler-Natta catalyst systems. The copolymers of interest here can have a density in the range of 0.860 to 0.930 gram per cubic centimeter, and preferably have a density in the range of 0.880 to 0.920 gram per cubic centimeter.

The copolymers can be and are preferably produced by low pressure processes. They are preferably produced in the gas phase, but they can also be produced in the liquid phase in solutions or slurries by conventional techniques. Low pressure processes are typically run at pressures below 1000 psi. Typical transition metal catalyst systems, which can be used to prepare these copolymers, include magnesium/titanium based catalyst systems, which can be exemplified by the catalyst system described in U.S Pat. No. 4,302,565 (heterogeneous polyethylenes); vanadium based catalyst systems such as those described in U.S Pat. Nos. 4,508,842 (heterogeneous polyethylenes) and 5,332,793; 5,342,907; and 5,410,003 (homogeneous polyethylenes); chromium based catalyst systems such as that described in U.S Pat. No. 4,101,445; metallocene catalyst systems such as that described in U.S. Pat. Nos. 4,937,299 and 5,317,036 (homogeneous polyethylenes); or other transition metal catalyst systems. Many of these catalyst systems are often referred to as Ziegler-Natta catalyst systems. Catalyst systems which use chromium or molybdenum oxides on silicaalumina supports, are also useful. Typical processes useful for preparing the copolymers of the present invention are also described in the aforementioned patents. The various copolymers can include linear low density copolymers, very low density copolymers, and medium density copolymers.

Melt Index (g/10 min) is determined under ASTM D-1238, Condition E. It is measured at 190 degrees C. and reported as grams per 10 minutes. Flow Index is determined under ASTM D-1238, Condition F. It is measured at 190 degrees C. at 10 times the weight used in the melt index test above. Melt flow ratio is the ratio of flow index to melt index. Density is measured by producing a plaque in accordance with ASTM D-1928, procedure C, and then testing "as is" via ASTM D-1505. The density is reported in gram per cubic centimeter.

Conventional additives, which can be introduced into the polyethylene composition, are exemplified by antioxidants, coupling agents, ultraviolet absorbers or stabilizers, anti-static agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Fillers and additives can be added in amounts effective to achieve the function desired of the additive, generally ranging from less than about 0.1 to more than about 200 parts by weight for each 100 parts by weight of the base resin, the higher amounts generally being used for filllers and polymeric additives.

Examples of useful antioxidants are: hindered phenols such as tetrakis [methylene(3,5-di-tert-butyl-4-hydroxyhydrocinnamate)]-methane, bis [(beta-(3,5-ditert-butyl-4-hydroxybenzyl)-methylcarboxyethyl)]sulphide, 4,4-thiobis(2-methyl-6-tert-butylphenol), 4,4-thiobis(2-tert-butyl-5-methylphenol), 2,2-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of polyethylene.

The polymeric chains in the polyethylene of the present invention can be crosslinked by adding a crosslinking agent to the composition or by making the resin hydrolyzable, which is accomplished by adding hydrolyzable groups such as —Si(OR)$_3$ wherein R is a hydrocarbyl radical to the resin structure through copolymerization or grafting. They can also be crosslinked by irradiation.

Suitable crosslinking agents are organic peroxides such as dicumyl peroxide; 2,5-dimethyl- 2,5-di(t-butylperoxy) hexane; t-butyl cumyl peroxide; and 2,5-dimethyl-2,5-di(t-butylperoxy)hexane-3. Dicumyl peroxide is preferred.

Hydrolyzable groups can be added, for example, by copolymerizing ethylene and comonomer(s) with an ethylenically unsaturated compound having one or more —Si(OR)$_3$ groups such as vinyltrimethoxysilane, vinyltriethoxysilane, and gamma-methacryloxypropyltrimethoxysilane or grafting these silane compounds to the either resin in the presence of the aforementioned organic peroxides. The hydrolyzable resins are then crosslinked by moisture in the presence of a silanol condensation catalyst such as dibutyltin dilaurate, dioctyltin maleate, dibutyltin diacetate, stannous acetate, lead naphthenate, and zinc caprylate. Dibutyltin dilaurate is preferred.

Examples of hydrolyzable copolymers and hydrolyzable grafted copolymers are ethylene/comonomer/ vinyltrimethoxy silane copolymer, ethylene/comonomer/gamma-methacryloxypropyltrimethoxy silane copolymer, vinyltrimethoxy silane grafted linear low density ethylene/1-butene copolymer, and trimethoxy silane grafted low density polyethylene.

Cables can be prepared in various types of extruders, e.g., single or twin screw types. Compounding, i.e., polymer plus additives, can be effected in the extruder or prior to extrusion in a conventional mixer such as a Brabender mixer; a Banbury mixer; or the twin screw extruder. A description of a conventional extruder can be found in U.S Pat. No. 4,857,600. A typical extruder has a hopper at its upstream end and a die at its downstream end. The hopper feeds into a barrel, which contains a screw. At the downstream end, between the end of the screw and the die, are a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked after extrusion, the die of the crosshead feeds directly into a heating zone, and this zone can be maintained at a temperature in the range of about 100 degrees C. to about 260 degrees C., and preferably in the range of about 120 degrees C. to about 220 degrees C.

The advantages of this invention include the much improved processability of polyethylene in an extrusion process for making power cable, and the relatively lower viscosity of the polyethylene compared to conventional LDPEs with long chain branching. Compositions which include the copolymer, are useful in low, medium, and high voltage applications.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

All molecular weights mentioned in this specification are weight average molecular weights unless otherwise designated.

The patents and patent application mentioned in this specification are incorporated by reference herein.

The invention is illustrated by the following examples.

EXAMPLES 1 TO 8

The resins are copolymers of ethylene and the comonomers referred to in Table I. The resins of Examples 1, 3, 4, 5, 6, and 7 are made with a spray dried magnesium/titanium based catalyst as described in U.S Pat. No. 5,290,745. The resin of Example 8 is made with a silica-supported Ti-based catalyst, Davison Sylopol™ 5950. The resin of Example 2 is a compounded mixture of resin made with a conventional Ziegler-Natta catalyst and a resin made with a metallocene catalyst. The resin of Example 5 is made with a chromium based catalyst as described in U.S. patent application Ser. No. 928,734 filed on Sep. 12, 1997. A melt index is selected and the minimum melt flow ratio is determined in accordance with the formula set forth above. The resin of Example 9 is a crosslinked low density polyethylene made by a high pressure process (HP-LDPE).

Density is measured by a density column in accordance with ASTM D-792. The standard deviation of density measurement is 0.003 gram per cubic centimeter. Melt index and melt flow ratio are defined above. The standard deviations of melt index and melt flow ratio are 10 percent and 20 percent, respectively. Viscosity is measured by a Capillary Rheometer run at 140 degrees C. using 20/1 L/D (length to diameter ratio) under different shear rates, such as 90, 180, 360, and 900 per second. Variables and results are reported in Table I.

TABLE I

| Example | 1 | 2 | 3 | 4 | 5 | 6 | 7 | 8 | 9 |
|---|---|---|---|---|---|---|---|---|---|
| Comonomer | C4 | C4 And C8 | C4 | C4 | C4 | C4 And C6 | C4 | C4 | none |
| density (g/cc) | 0.886 | 0.887 | 0.918 | 0.900 | 0.917 | 0.921 | 0.924 | 0.916 | 0.923 |
| MI (g/10 min) | 0.7 | 6.7 | 0.9 | 5.0 | 0.7 | 0.6 | 19.5 | 3.1 | 2.1 |
| MFR | 36.1 | 34.9 | 27.6 | 26.9 | 72.3 | 136 | 24.7 | 67.9 | 55.6 |
| Viscosity (Pa-s) at 140° C., 900 1/s | 513 | 287 | 445 | 386 | 442 | 324 | 263 | 287 | 320 |

Notes to Tables:
  C4=1-butene
  C6=1-hexene
  C8=1-octene
  Mixture of 1-butene and 1-octene in example 2=80 percent by weight ethylene/1-butene copolymer and 20 percent by weight ethylene/1-octene copolymer.
  Example 6 is an ethylene, 1-butene, and 1-hexene terpolymer with a mixture of 39 percent by weight 1- butene and 61 percent by weight 1-hexene. The molar ratio of the comonomers to ethylene is about 0.4.
  MI=melt index
  g/10 min=grams per 10 minutes
  MFR=melt flow ratio
  Viscosity (Pa-s) at 140° C., 900 1/s=

It will be observed that Examples 2, 7, and 8 meet the MFR (melt flow ratio) criteria at a given melt index. Thus, viscosity is substantially lower than those of Examples 1 and 3 to 6, and better than the crosslinked HP-LDPE composition of Example 9, which contains long chain branching.

Table II provides a calculated minimum melt flow ratio for each MI to achieve good processability.

TABLE II

| MI | minimum MFR |
|---|---|
| 1 | 162.9 |
| 2 | 83.6 |
| 3 | 56.6 |
| 4 | 42.9 |
| 5 | 34.6 |
| 6 | 29.1 |
| 7 | 25.1 |
| 8 | 22.0 |
| 9 | 19.7 |
| 10 | 17.8 |
| 11 | 16.2 |
| 12 | 14.9 |
| 13 | 13.8 |
| 14 | 12.9 |
| 15 | 12.0 |

Table III provides a calculated minimum MI for each melt flow ratio in Table I to achieve good processability in terms of viscosity.

TABLE III

| Example in Table I | MI from Table I | minimum MFR to achieve good processability | MFR from Table I |
|---|---|---|---|
| 1 | 0.7 | 229.6 | 36.1 |
| 2 | 6.7 | 26.1 | 34.9 |
| 3 | 0.9 | 180.3 | 27.6 |
| 4 | 5.0 | 34.6 | 26.9 |
| 5 | 0.7 | 229.6 | 72.3 |
| 6 | 0.6 | 266.3 | 136 |
| 7 | 19.5 | 9.3 | 24.7 |
| 8 | 3.1 | 55 | 67.9 |

What is claimed is:

1. A process comprising selecting and extruding a copolymer having improved extrusion processability comprising (a) selecting one or more copolymers of ethylene and one or more alpha-olefins having 3 to 12 carbon atoms, each of said copolymers having essentially no long chain branching and having (1) a melt index selected from the range of about 0.1 to about 20 grams per 10 minutes, and (2) a melt flow ratio having at least about a value determined by the following formula: 2.7183 to the power of {(1.477 minus [0.279 times the natural logarithm of the selected melt index]) divided by 0.29} and (b) extruding said copolymer around an electrical conductor.

2. The process defined in claim 1 wherein the melt index is selected from the range of about 1 to about 10 grams per 10 minutes and the density of the copolymer is in the range of 0.880 to 0.920 gram per cubic centimeter.

3. The process defined in claim 1 wherein the alpha-olefin has 4 to 8 carbon atoms.

4. The process defined in claim 1 wherein the alpha-olefin is 1-butene, 1-hexene, or 1-octene.

5. The process defined in claim 1 wherein the alpha-olefin is a mixture of 1-butene and 1-hexene or a mixture of 1-butene and 1-octene.

* * * * *